Figure 1:
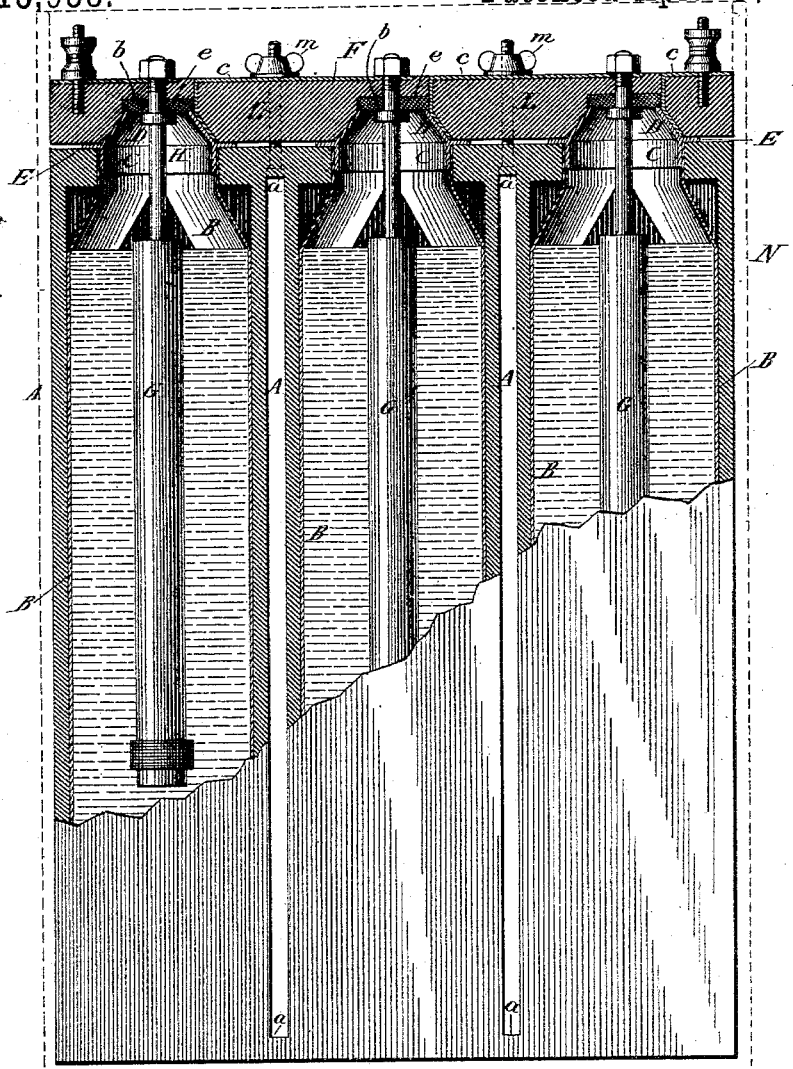

(No Model.)

A. HAID.
GALVANIC BATTERY.

No. 315,938. Patented Apr. 14, 1885.

Attest:
Raymond F. Barnes
W. Frisby

Inventor:
Alfred Haid
By Parker W. Page
atty.

UNITED STATES PATENT OFFICE.

ALFRED HAID, OF RAHWAY, NEW JERSEY, ASSIGNOR TO THE EXCELSIOR ELECTRIC APPARATUS COMPANY, OF NEW YORK, N. Y.

GALVANIC BATTERY.

SPECIFICATION forming part of Letters Patent No. 315,938, dated April 14, 1885.

Application filed October 28, 1884. (No model.)

*To all whom it may concern:*

Be it known that I, ALFRED HAID, a subject of the Emperor of Germany, and a resident of Rahway, in the county of Union and State of New Jersey, have invented certain new and useful Improvements in Galvanic Batteries, of which the following is a specification, reference being had to the drawings accompanying and forming a part of the same.

My present invention relates to portable batteries—that is to say, those that are designed for supplying the current for miniature electric lamps worn as ornaments, and which in consequence are adapted to be carried about the person, or that are intended for use in surgical operations, either cauterizing or operating small lamps in instruments for examining the interior of the mouth, throat, &c. My objects are mainly to reduce as far as possible the size of the batteries to prevent spilling or leakage, and to lessen the cost and care of maintaining them in condition for useful work. To this end I employ as elements a rod of zinc and a sheet of silver, and an exciting-liquid containing as a depolarizer any compound that, without dissolving the silver, will, when acted upon by the current, set free oxygen. These elements I inclose in cells of hard rubber, gutta-percha, or similar material in the following way: I first form a series of cells by molding, and in each I introduce a sheet of pure silver that is pressed against the sides of the cell, so as to form a lining. To the mouth of each cell is fixed a silver or copper ring in contact with the lining. A cover is provided for the cells, and the zinc rods are secured to it in proper positions to enter the cells. Around the zincs on the under side of the cover are soft-rubber washers that fit over the metal rings and prevent the escape of the liquid, and metallic strips pass through the cover and are arranged to make contact with the rings at the rim of the cells. The specific construction of these parts will be described in detail hereinafter by reference to the drawings.

So far as I am aware, silver as a negative element has been used either without a depolarizing compound, as in the well-known Smee battery, or with a depolarizer that does not change its metallic or chemical condition, such as chloride of silver. One of the main objects which I have in view—that is to say, to produce a high electro-motive force by the smallest possible battery—is not practicably obtainable by the use of chloride of silver, for the reason that the chlorine has a very strong affinity for the silver as well as for the zinc, and the resultant action produces, therefore, a comparatively low electro-motive force. On the other hand bisulphate of mercury, bichromate of potash, and similar depolarizing compounds that give off oxygen under the action of a current yield with zinc and silver a very much higher electro-motive force, but under ordinary conditions their use is not desirable or even practicable, because of the effect which they produce upon the silver. For instance, by the use of the bisulphate of mercury the silver becomes a brittle amalgam, none the less efficient as an element, but incapable of withstanding handling or the usage to which the plates of batteries are usually exposed. Similar effects are produced by the formation of chromate of silver from the bichromate of potash. Some substances—such as nitric acid or those that destroy the silver—cannot, of course, be used, and are not included in my claim.

To render practicable the use of the depolarizers which I have named, I support the silver sheets within the cells as above described, applying them so that they will form linings as far as possible. In this condition they are not removable and not exposed to injury in replenishing the battery liquids after they have become softened and brittle by use.

I will now refer to the drawings for a more detailed description of the invention.

Figure 2:
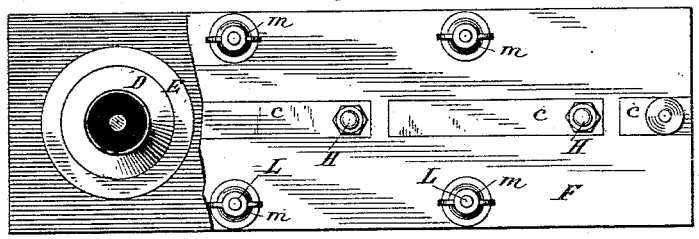

Figure 1 is a view in part section and side elevation of a series of cells, and Fig. 2 is a top and part sectional view of the same.

The cells A are of hard rubber, and are made in molds in halves or sections, subsequently united. In order to prevent entirely the access of fluids from one cell to another, each cell is made independent and complete in itself, being united to the others by the solid bridge-pieces *a a*. This construction is one of the novel features of my invention. In the cells A are the sheets B of pure silver. These sheets are introduced into the cells after they are formed, and by suitable instruments pressed out against the interior walls of the cells, so as to form as far as possible a lining therefor. A ring or band of copper with a straight portion, C, a conical part, D, and a flange, E, is set in the opening or mouth of each cell and connected electrically with the silver electrode. The cover F, of hard rubber, contains conical recesses corresponding in position and shape to the conical parts D of the copper rings. The zinc rods G are carried by metal rods H, that are secured in the cover in the center of each recess. Soft rubber washers $e$ are held by shoulders $b$ on the rods H against the cover in the recesses, and copper strips $c$ pass through the cover and are embedded in the sides of the conical recesses, the strips above the cover being in connection with the zinc of the next cell in the series, or with a binding-post, as the case may be. Screw-rods L, set in the bridge-pieces $a\ a$ or elsewhere in the top of the cells, pass through perforations in the cover when the latter is in place, and thumb screws $m$ on these rods clamp the cover down. When the cover is clamped down, the copper strips $c$ are in contact with the copper rings D, and the openings of the cells are closed by the soft-rubber washers $e$. No liquid can then escape if the joint between the copper ring and the material of the cells is perfectly tight. To insure this, I sometimes make the cells with the mouth or rim of softer rubber than the remainder, so that a better union may be made. It is evident that the precise form of the copper rings may be very greatly varied without materially affecting the results. The construction of the cells as I have described it, is, however, the most practicable and useful of which I am aware.

In preparing the cells for use, the liquid is poured in and the cells closed. It is desirable to use an open box or case, $n$, (shown in dotted lines,) when the cells are to be carried about the person.

The liquid which I use is an exciting-solution containing a depolarizing-compound that liberates oxygen under the influence of a current, and which does not dissolve or destroy the silver, the liquid preferred being a solution of bisulphate of mercury with sulphuric acid and water. The advantages of this have already been pointed out.

I am aware that silver and other metals have been used in the form of linings for galvanic batteries, and this I do not claim.

What I claim as my invention is—

1. In a portable or pocket battery, the combination, with silver negative electrodes in the form of linings for the cells and zinc positive electrodes, of an exciting-solution containing as a depolarizer bisulphate of mercury or its described equivalent, as herein set forth.

2. A series of battery-cells composed of a molded plastic substance, each cell being independent but connected at top and bottom to the next adjoining cell by the solid molded connections $a\ a$.

3. In a portable or pocket battery, the combination, with a series of cells, and metal rings at the openings or mouths of the same in connection with the negative electrodes, of a cover having soft-rubber washers for closing the cells, zinc rods secured to the cover and metal contact-strips passing through the cover, and means for clamping the same to the cells, as set forth.

4. In a portable or pocket battery, the combination, with a series of cells and metal rings with conical parts D secured to the mouth of the cells in connection with the negative electrodes, of a cover having conical recesses, zinc rods passing through the cover, soft-rubber washers around said rods and in the bottom of the recesses, metal contact-strips passing through the cover, and means for clamping the cover to the cells, as set forth.

In testimony whereof I have hereunto set my hand this 14th day of October, 1884.

ALFRED HAID.

Witnesses:
PARKER W. PAGE,
W. FRISBY.